United States Patent [19]

Neefe

[11] Patent Number: 4,522,695

[45] Date of Patent: Jun. 11, 1985

[54] VAPOR PHASE HYDROGEN GENERATOR

[76] Inventor: Charles W. Neefe, 811 Scurry St., Box 429, Big Spring, Tex. 79720

[21] Appl. No.: 605,398

[22] Filed: Apr. 30, 1984

Related U.S. Application Data

[63] Continuation-in-part of Ser. No. 440,080, Dec. 23, 1982, Pat. No. 4,472,260.

[51] Int. Cl.³ .................... C25B 1/10; C25B 9/00; H01M 6/34
[52] U.S. Cl. .................... 204/266; 204/278; 204/129; 429/111
[58] Field of Search ............... 204/129, 278, 266, 128; 429/111

[56] References Cited

U.S. PATENT DOCUMENTS

| | | | |
|---|---|---|---|
| 4,094,751 | 6/1978 | Nozik | 204/129 |
| 4,194,949 | 3/1980 | Stark | 204/128 |
| 4,401,371 | 8/1983 | Neefe | 204/129 X |
| 4,414,080 | 11/1983 | Williams et al. | 204/278 X |

FOREIGN PATENT DOCUMENTS

| | | | |
|---|---|---|---|
| 2410506 | 8/1979 | France | 204/129 |
| 00353 | 3/1980 | Switzerland | 204/129 |

Primary Examiner—Donald R. Valentine

[57] ABSTRACT

A hydrogen and oxygen generator having photoreceptors supported in a hydrophilic foam. The photoreceptors produce an electric current when exposed to sunlight. Water vapor present inside the generator provides the liquid to solid junction whereby the water is decomposed by electrolysis to provide hydrogen and oxygen. The gases are removed from the generator by passing through a selective permeable membrane.

3 Claims, 1 Drawing Figure

VAPOR PHASE HYDROGEN GENERATOR

This is a continuation-in-part of application Ser. No. 440,080 filed Dec. 23, 1982, now U.S. Pat. No. 4,472,260 entitled "A LIGHT DRIVEN HYDROGEN OXYGEN GENERATOR."

THE PRIOR ART

The production of hydrogen for use as a fuel is receiving world wide attention. The most desirable approach is the conversion of water to hydrogen and oxygen by use of sunlight. The process encounters many problems, one which we are solving here is the accumulation of debris from the water on the surface of the photo receptors.

FIELD OF THE INVENTION

Figure 1:
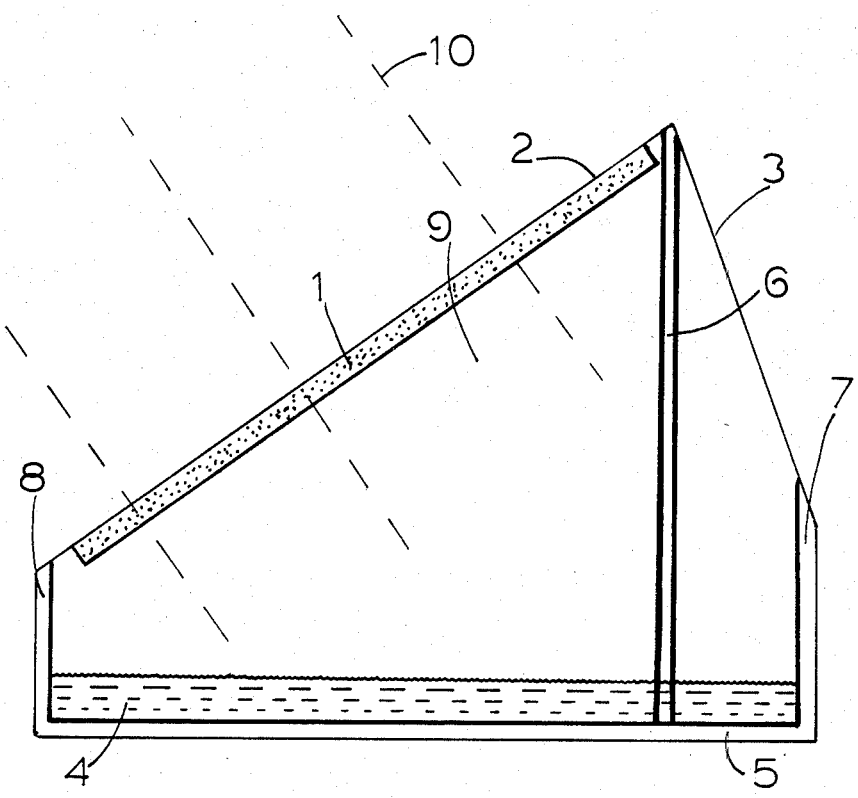
FIG. 1 shows the generator in section.

Natural photosynthesis provides the most obvious example of photochemical solar energy conversion. Field efficiency (yearly average, best crops and so on) is about 1%. These figures are not so high as the efficiency for electricity generation by solid-state photovoltaics. Sunlight-induced photoelectrolysis conversion of water to hydrogen and oxygen approaches the field efficiency of natural photosynthesis. Solid-stage photovoltaic devices are the only man-made systems having any wide spread use for solar energy conversion based on electronic excitations. Solid/liquid junction devices represent the best chemical systems for converting light to hydrogen and oxygen from water. The most impressive systems for solar energy conversion to electricity and production of oxygen from water involve the interfacial photoredox events at the junction between semiconductors and liquid electrolyte solutions. Semiconductor/liquid junction cells are different from photogalvanic cells in that light is absorbed by a solid electrode, not by electrolyte species in solution. The most efficient system for the photoelectrolysis of water is the strontium titanium trioxide based cell. The overall efficiency of converting solar energy to hydrogen and oxygen is about 1%. N-type titanium dioxide/p-type gallium phosphorous based cells produce hydrogen and oxygen with no other energy input than the light striking the two electrodes. This type of observation led to the conclusion that "photochemical diodes" consisting of aqueous suspensions of n-type titanium dioxide/p-type gallium phosphorus particles can yield hydrogen and oxygen from water on optical excitation. Another approach is to sensitize stable semiconductors using visible-light absorbing dyes attached to the surface. In this approach, the aim is to absorb light by a dye layer on the semiconductor surface to produce an excited state; this has been achieved by using zinc oxide sensitized with rose bengal.

The carrier foam material 1 FIG. 1 may be any hydrophilic water containing material. Examples of carrier materials are poly hydroxypropyl methacrylate and hydratable polymethylmethacrylate hydroxyethyl methacrylate and a foaming agent such as sodium bicarbonate.

Photosensitive particles are suspended in the monomers and a suitable catalyst is added to achieve polymerization. The photosensitive particles are selected from titanium dioxide combined with gallium phosphorous; platinum combined with strontium titanium trioxide, tin oxide combined with a dye; or zinc oxide combined with rose bengal dye. Ferric oxide, titanium dioxide, tin oxide and zinc oxide photoanodes may be used in combination with a nobel metal such as platinum. After polymerization, the transparent foam polymer containing the photosensitive particles imbedded in the polymer is hydrated. After hydration by water vapor, the liquid semiconductor junction is established at the photosensitive interface and hydrogen and oxygen will be released by the electrolysis of water upon exposure to sunlight. The foam provides an increased energy density.

Procedures have been developed for making polymers having sulfonate groups exposed at the surface. In general these procedures involve forming sulfonate containing copolymers then adding a chemical agent that creates crosslinks among the long-chain molecules.

The most hydrophilic known polymers are those bearing on their surface the sulfonate group, $SO_3$. Like the sulfuric acid from which they are derived, sulfonate polymers have a strong affinity for water. Each sulfonate group is surrounded by many water molecules, which cannot be displaced. The sulfonate group is also incapable of hydrogen bonding; indeed, its negative charge repels the negatively charged debris particles. The negative charge of the sulfonate is also maintained even in the presence of a large concentration of hydrogen ions. Moreover, the sulfonate group resists deactivation by positive ions, such as those of the heavy metals.

In addition to providing resistance to debris, the fixed charges of the sulfonate groups confer another property; the enhanced rejection of salts. Uncharged surfaces, have only limited ability to exclude salts, which exist in solution as negative and positive ions. In the sulfonates, however, the fixed negative charges generate an electric field that repels ions of the same charge and thereby excludes them from the surface. Since the electrical neutrality of the solution must be maintained positive ions are also blocked.

Sulphur and phosphorous containing polymers have been found to exhibit the highest degree of hydrophilicity with the sulfonates being the most hydrophilic. The monomers may be selected from the following or other similar monomers:
1. Allyl Disulfide
2. Allylethylsulfide
3. Allyl Methyl Sulfide
4. Allylphenyl Sulfide
5. Allyl n-propyl Sulfide
6. Allyl iso-Propyl Sulfide
7. Diallyl Phosphite
8. Daillyl Disulfide
9. Diallyl Sulfide
10. Divinyl Sulfone
11. Ethylene Sulfide
12. Sodium Allyl Sulfonate
13. Sodium p-Styrene Sulfonate
14. Vinyl Sulfonate, Sodium Salt
15. Vinyl Sulfonic Acid
16. Styrene Sulfonic Acid
17. Diallyl Phosphonate
18. Diallyl Phosphite
19. beta-Styrene Sulfonate
20. Triallyl Phosphate
21. Vinyl Methyl Sulfide
22. Vinyl Triphenylphosphonium Bromide 23. Vinyl Ethyl Sulfone
24. Soidum Styrene Sulfonate Copolymers are formed by polymerizing the above sulphur and phosphorous monomer with one or more of the following examples:
1. Methylmethacrylate and methacrylic acid
2. Ethylene Glycol Monomethacrylate
3. Hydroxypropyl Methacrylate Crosslinkers may be selected from one or more of the following examples:
1. Diglycol Carbonate
2. Allyl Methacrylate
3. Tetraethylene Glycol Dimethacrylate
4. Ethylene Dimethacrylate
5. Divinyl Benzene
6. Vinyl Crotonate The liquid solid junction is made with the electrolyte contained within the matrix of the polymer foam material. This provides unique conditions of self regulation and supplying a permanent contamination free liquid to solid interface. These properties separate or together offer many improvements in other applications of solar energy. Self regulation occurs when $O_2$ or $H_2$ are produced at a rate greater than the migration rate into the polymer matrix away from the reaction site where the gases are formed. When undissolved gas accumulates on the surface of the reaction site; the water is displaced and further gas production stops until the gas dissolved or is free to migrate.

DESCRIPTION OF THE PREFERRED EMBODIMENT

Photosensitive particles are formed by coating strontium titanium trioxide pellets, and breaking the pellets between metal rollers. The fractured particles are then mixed with the monomer hydroxyethyl methacrylate, 2% of the crosslinkers ethylene dimethacrylate and 0.25% of the catalyst 2, $2^1$ Azobis (2 methylpropionitrite) purged of oxygen, placed under a nitrogen blanket and heated to 95° C. for twelve hours. A foam is formed as the reaction temperature hydrates and exceeds the boiling point of the monomers. When exposed to light, an electric potential will be present across the junction, and oxygen will be released from the strontium titanium trioxide surface. The water present within the hydrophilic foam material acts as the required electrolyte.

The water 4 FIG. 1 present in the catch basin 5 FIG. 1 is warmed by the incoming sunlight 10 FIG. 1 and fills the space 9 FIG. 1 with highly humid air. The air being warmed by the sun has the ability to hold a large volume of water which condenses on the cooler surfaces 2 FIG. 1. The transparent polyvinyl chloride cover 2 FIG. 1 allows light to reach the foam 1 FIG. 1 containing the photosensitive particles. The foam 1 FIG. 1 is also cooled by being held in contact with the transparent cover 2 FIG. 1 and the water vapor present in the air 9 FIG. 1 will condense on the foam 1 FIG. 1 providing pure contamination free water for the electrolyte. Gases hydrogen and oxygen are removed through the thin silicone rubber membrane 3 FIG. 1. Water vapors will not pass through the silicone membrane 3 FIG. 1. Condensation occurring on the membrane 3 FIG. 1 will form droplets and pass down to support 7 FIG. 1 and re-enter the reservoir water 4 FIG. 1. The support 6 FIG. 1 holds both the foam with the photo reactor particles and the gas permeable membrane 3 FIG. 1 in position. Surplus condensation forming on the transparent cover 2 FIG. 1 and the foam 1 FIG. 1 will form droplets and pass downward to support 8 FIG. 1 and return to the water reservoir 4 FIG. 1. Only water which has passed into the vapor phase can leave the reservoir water 4 FIG. 1 and migrate to the hydrophilic foam 1 FIG. 1. In this way the photoreceptors in the foam are exposed to light and water in a large surface area within the foam 1 FIG. 1.

Various modifications, of course, can be made without departing from the spirit of this invention or the scope of the appended claims. It is understood that many variations are obtainable which will yield results as disclosed herein. The constants set forth in this disclosure are given as examples and are in no way final or binding.

I claim:
1. A light powered hydrogen and oxygen generator having a plurality of light absorbing semiconductor receptors supported in a hydrophilic foam, a water to solid junction is formed between the light absorbing semiconductors and water supplied by water vapor contained in the hydrogen and oxygen generator said light receptors being capable of producing an electrical current when activated by light, and providing hydrogen and oxygen by the decomposition of water by electrolysis.

2. A hydrogen and oxygen generator having a plurality of light absorbing semiconductor photo receptors supported in a hydrophilic foam, said light receptors being capable of producing an electrical current when activated by light, and producing hydrogen and oxygen by the decomposition of water by electrolysis.

3. A hydrogen and oxygen generator having a plurality of light absorbing semiconductor receptors supported in a hydrophilic foam, a liquid to solid junction is formed between the light absorbing semiconductors and water supplied by water vapor contained in the hydrogen and oxygen generator said light receptors being capable of producing an electrical current when activated by light, and providing hydrogen and oxygen by the decomposition of water by electrolysis, the generated hydrogen and oxygen are removed from the generator by passing through a gas permeable membrane.

* * * * *